April 28, 1953     J. T. KANEMOTO     2,636,353
IRRIGATION DAM STICK
Filed May 19, 1952
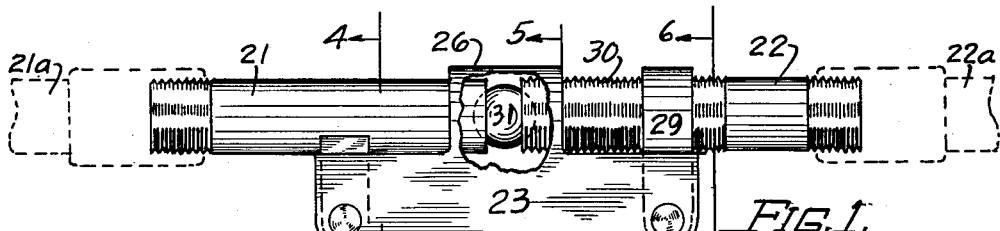
*Fig.1.*
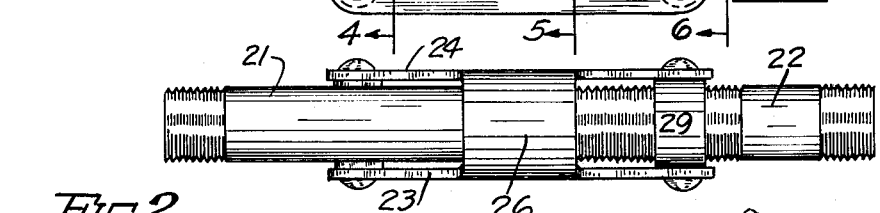
*Fig.2.*
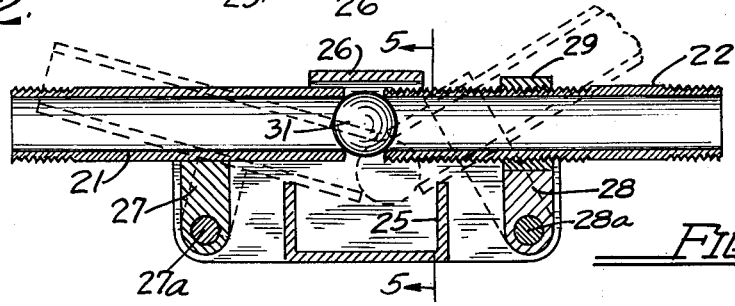
*Fig.3.*
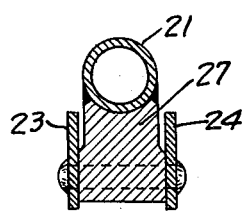   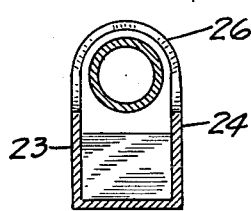   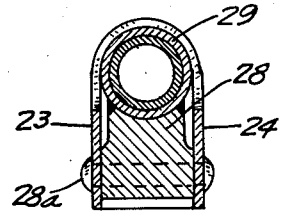
*Fig.4.*     *Fig.5.*     *Fig.6.*
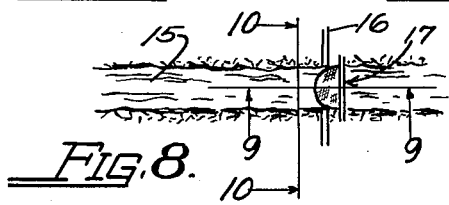   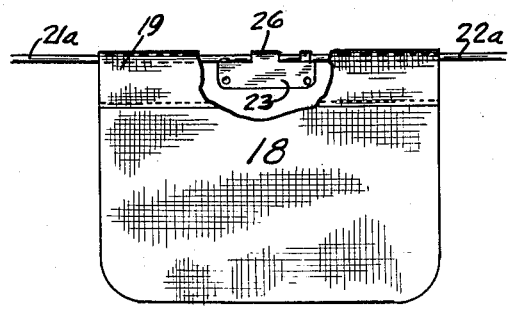
*Fig.8.*
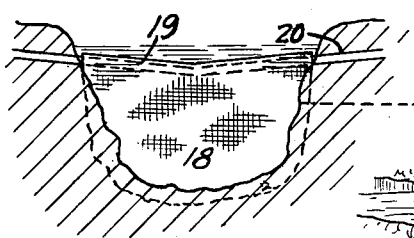   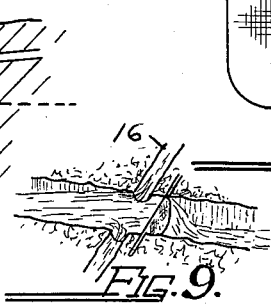
*Fig.10.*     *Fig.7.*
*Fig.9.*
INVENTOR.
JIMMIE T. KANEMOTO
BY Martin E. Anderson
ATTORNEY Patented Apr. 28, 1953

2,636,353

UNITED STATES PATENT OFFICE 2,636,353

IRRIGATION DAM STICK

Jimmie T. Kanemoto, Longmont, Colo.

Application May 19, 1952, Serial No. 288,593

3 Claims. (Cl. 61—29)

This invention relates to improvements in irrigation dam sticks.

In parts of the country where rainfall is below normal irrigation is practiced and water is flowed through the sections to be irrigated in canals from which water is diverted to the fields through smaller or lateral canals. The land owner diverts water from the laterals to his fields. Where the water is diverted from the laterals it is necessary to provide temporary dams that raise the level sufficiently to make it flow into the diversion ditches that lead to the fields.

The temporary dams in most common use are "canvas dams" which comprise a heavy canvas of a size greater than the cross section of the canal to be dammed. One edge of the canvas is formed into a wide hem through which a stick extends. The stick is of such length that it reaches entirely across the canal and its ends are positioned in depressions formed to receive them. The edges of the canvas are weighted down with ground and when properly positioned such dams raise the level of the water until it flows over the top of the dam whose height is determined by the elevation of the stick. If the level is to be changed the stick must be either raised or lowered which requires a considerable amount of work.

It is the object of this invention to produce an irrigation dam stick that comprises two rods or pipes interconnected by a hinge means that permits the two parts to be adjusted angularly with respect to each other after the dam is in place so that the water level can be altered without changing the canvas dam except to lower or raise the upper edge thereof.

The above and other objects that will appear as the description proceeds are attained by means of a construction and an arrangement of parts that will now be described in detail for which purpose reference will be had to the accompanying drawing in which the invention has been illustrated and in which:

Figure 1 is a side elevation of the invention showing the parts in one position with parts broken away to better disclose the construction;

Figure 2 is a top plan view;

Figure 3 is a section taken on line 3—3, Figure 2, and shows by broken lines the other extreme position of the parts;

Figure 4 is a section taken on line 4—4, Figure 1;

Figure 5 is a section taken on line 5—5, Figures 1 and 3;

Figure 6 is a section taken on line 6—6, Figure 1;

Figure 7 is a side elevation of a canal dam showing the stick in place in the hem thereof, a portion being broken away to better disclose the position of the parts;

Figure 8 is a diagram illustrating the position of the dam in an irrigation canal lateral;

Figure 9 is a section taken on line 9—9, Figure 8, and

Figure 10 is a section taken on line 10—10, Figure 8.

In the drawing reference numeral 15 designates an irrigation canal lateral, 16 represents small ditches for conducting water to the field, or instead of ditches syphon tubes may be used, and reference numeral 17 designates the canal dam as a whole.

The dam is formed from a large piece of canvas 18 having a wide hem 19 for the reception of the dam stick 20 whose length is such that its ends rest on the opposite sides of the canal. The edges of the canvas are held in place against the sides and bottom of the canal by mud loaded thereon.

The canals are usually inclined as shown in Figure 9 and by means of the dams of level of the water can be raised until it flows over the top of the dam. Since only a small portion of the water is removed at each dam the remainder flows over.

In Figure 10 the top of the dam has been shown as lower in the center and by adjusting the extent to which the center of the dam is lowered or raised the level of the water can be controlled.

This invention, as above pointed out, relates to the construction of the dam stick which will now be described.

The stick consists of two sections of pipe 21 and 22 that are connected by a hinge of such construction that the angular relation of the pipes can be altered. The connecting means or hinge consists of a body formed from two plates 23 and 24 held in spaced relation by a channel shaped member 25 which also serves another purpose to which reference will hereinafter be made. A semi-cylindrical member 26, connects the upper edges of the sides at their middle points. A metal block 27 is positioned between the sides at their left hand ends when viewed as in Figure 3 and is mounted on pivot 27a and a similar block 28 is positioned at the right hand end and mounted on pivot 28a. Pipe 21 is welded to the top of block 27 and a threaded ring 29 is welded to the top of block 28. Pipe 22 has a threaded section 30 and may be adjusted longitudinally with respect to ring 29 and connector 26. If pipe 22 is turned sufficiently to withdraw its threaded end from underneath 26 it can be turned through an angle of 180 degrees. The inner end of pipe 21 has a steel ball 31 welded to it and serves to interconnect the pipes to effect their uniform angular movement.

When pipe 22 is turned in a direction to move it inwardly and force it against the ball the pipes will tend to turn in opposite directions until their ends engage the inner surface of part 26. The parts are so proportioned and related that when the ball is under pressure the two pipes will be in axial alignment. When pipe 22 is turned in a direction to move its inner end away from the ball the pipes will move towards the broken line position shown in Figure 3. The angular relation of the pipes can be adjusted by rotating pipe 22 in ring 29. Member 25 serves as a stop as shown in Figure 3. When not in use pipe 23 is withdrawn entirely from 26 and can then be folded into a position 180 degrees from that shown.

Pipes 21 and 22 are of short length and threaded at their outer ends so that extension pipes 21a and 22a can be attached by suitable couplings in the manner indicated by broken lines.

The pipes can be of any suitable size and usually three quarter or one inch pipe. Since the dam is quite long a small angular inclination of the pipes produces a considerable depression at the center of the dam. Although a steel ball welded to the end of pipe 21 has proved satisfactory specifically different means may be substituted. Due to the fact that pivots 27a and 28a are spaced a considerable distance below the center of the pipes the ends of the pipes will have a considerable movement towards and away from each other as the pipes are moved about these pivots but after a certain angular movement has been reached the ends will move apart and stop 25 has therefore been provided to limit the movement before this point has been reached.

From the above description it will be apparent that a large amount of labor and inconvenience are avoided by the use of this device. Instead of employing the usual wood stick or pole which affords no adjustment and is inconvenient to transport the metal dam stick described above can be used. The pipes shown in full lines can be extended to any desired length by the use of old pipes that have been indicated by broken lines. When moving considerable distances the device can be folded. The device is marketed with short lengths of pipe as shown in full lines and therefore occupies small storage space and can be sold at a smaller price than if it were supplied with full length pipe. Since old and otherwise useless pipe are nearly always available the extra cost for the extension pipes is negligible. The convenience of being able to regulate the height of the dam by the simple act of turning one of the pipes is of great help. Although only one of the pipes have been shown as longitudinally adjustable relative to its pivoted lug it is to be understood that both may be so adjusted if desired.

What is claimed as new is:

1. An adjustable irrigation dam stick comprising two pipe sections arranged in axial alignment, each section having a laterally extending lug attached thereto adjacent its end, the lugs having pivot bearings positioned equal distances from the centers of the pipes, pivots in said bearings, metal plates interconnecting the pivots, one of the pipes having a threaded connection with its lug whereby it will move in the direction of its length relative to the lug when it is turned, a spacer element positioned between the adjacent ends of the pipe, said member having a convex surface facing the end of one of the pipes providing an abutment when the pipes are in axial alignment, means comprising a stop for preventing the pipe sections from moving angularly relative to each other in one direction beyond the point where they are in axial alignment and stop means carried by the metal plates for limiting the relative angular movement of the pipes in the other direction to a predetermined angle.

2. An adjustable irrigation dam stick comprising a body formed from two spaced plates connected along one edge by a stop member extending some distance on both sides of their middle points, a second stop and spacer member positioned between the plates along their other edges, two pipes associated with the base, each pipe having a lug extending laterally from one side thereof, the lug having bearings for pivot pins, the lugs being positioned between the plates, one adjacent each end thereof, the ends of the pipes extending underneath the first mentioned stop, one of the pipes having a threaded connection with its lug whereby it will move longitudinally when rotated, one of the pipes having its inner end provided with an outwardly convex projection adapted to enter the opposing end of the other pipe, the two pipes assuming an axially aligned position when the threaded pipe is moved inwardly until it exerts a force on the opposing end of the other pipe sufficient to move the pipes against the first mentioned stop, the pipes being free to assume an angular relation when the threaded pipe is withdrawn the extent of said angular movement being limited by the second mentioned stop.

3. An irrigation dam stick comprising in combination two pipes each having a lug attached thereto and extending laterally therefrom, adjacent one end, the lug having bearing openings whose axis are perpendicular to a plane containing the axis of the pipe, the axis of the bearing openings being spaced the same distance from the center of the pipe with which it is associated, pivot pins in said bearings, one of the pipes being threadedly connected with its lug whereby its position relative to the lug may be changed by rotating it relative to the lug, a hinge plate positioned on each side of the lugs having openings for the reception of the ends of the pivot pins, a curved loop connecting the upper edges of the hinge plates at a point substantially midway between the pivots, said loop forming a stop limiting the upward movement of the pipe ends, one of the pipes terminating in a lug having a convex end adapted to effect engagement with the opposing end of the other pipe whereby the angular relation of the pipes may be varied by rotating the threaded pipes, and a combined spacer element and stop positioned below the ends of the pipes to limit their angular adjustments.

JIMMIE T. KANEMOTO.

References Cited in the file of this patent

UNITED STATES PATENTS

| Number | Name | Date |
|---|---|---|
| 771,821 | Gleazen | Oct. 11, 1904 |